United States Patent [19]

Elsworth

[11] 4,172,871

[45] Oct. 30, 1979

[54] PROCESS FOR THE PRODUCTION OF SILICONE RUBBER PELLETS

[75] Inventor: Robert M. Elsworth, Loudonville, N.Y.

[73] Assignee: General Electric Company, Waterford, N.Y.

[21] Appl. No.: 810,527

[22] Filed: Jun. 27, 1977

Related U.S. Application Data

[63] Continuation of Ser. No. 363,537, May 24, 1973, abandoned.

[51] Int. Cl.$^2$ .............................................. B28B 11/06
[52] U.S. Cl. ..................................... 264/131; 264/148
[58] Field of Search ............... 264/131, 134, 133, 143, 264/144, 148; 260/46.5

[56] References Cited

U.S. PATENT DOCUMENTS

| | | | |
|---|---|---|---|
| 3,012,900 | 12/1961 | Heinmann et al. | 117/100 C |
| 3,340,228 | 9/1967 | Wu | 260/46.5 |
| 3,634,570 | 1/1972 | Himerleich et al. | 264/131 |

*Primary Examiner*—Jay H. Woo
*Attorney, Agent, or Firm*—Morgan, Finnegan, Pine, Foley & Lee

[57] ABSTRACT

Silicone rubber pellets are made by extruding a silicone rubber composition through a die to produce one or more strands, passing the strands into a chamber containing a dust cloud of a dry particulate agent for preventing silicone rubber pellets from adhering to one another and comminuting the strands into pellets. Preferred silicone rubber pellets comprising cylindrical shapes of $\frac{1}{8}$ to $\frac{1}{4}$ inches in diameter and from $\frac{1}{8}$ to $\frac{1}{2}$ inches in length, and uniformly coated with the dry particulate agent, e.g., mica, talc or diatomaceous earth, are uniquely adapted to feeding extruders.

1 Claim, No Drawings

PROCESS FOR THE PRODUCTION OF SILICONE RUBBER PELLETS

This is a continuation of application Ser. No. 363,537 filed May 24, 1973, now abandoned.

This invention relates to pelletized silicone rubber and a process for the production thereof. More particularly, it concerns vulcanizable silicone rubber compositions in the form of pellets uniformly coated with a dry particulate agent to prevent sticking. The product is produced by extruding comminuted pellets of the composition into a chamber filled with dust cloud of the dry particulate agent.

BACKGROUND OF THE INVENTION

Known methods for making plastic pellets and organic rubber pellets are not generally applicable to the pelletization of silicone rubber. Pelletized forms of silicone rubber are very useful because they can be fed to extrusion devices for coating electrical wires with silicone rubber insulations, without the need to cut sheets or plates of the composition into small strips, as is done conventionally. It is difficult, because of its inherent weak consistency, to pelletize silicone rubber, and most attempts produce irregular shaped granules which tend either to stick together or not to flow freely during packaging and use.

French Pat. No. 1,567,578 describes one way of providing silicone rubber pellets. This is a generally two step method in which the sheet of silicone rubber composition is cut into ribbons and then the ribbons are cross-cut into "pastilles." Both operations are carried out in an "atmosphere" of a pulverizing agent, such as talc. In addition to requiring a complicated apparatus having a first and a second cutting element, the process of the French patent produces the silicone rubber in the form of approximately cubical, and preferably regular form cubes or balls, called "pastilles." The cubical form has sharp edges and tends not to flow freely in extruder hoppers.

It has now been discovered that if silicone rubber compositions are coated as they are extruded into strands, and the strands are comminuted in a chamber filled with a dust fog or cloud of particulate agent for coating the pellets, before contact is made with other strands, and the pellets are completely encapsulated in dust before they are chopped from the strands, a superior product is provided, in only one step, and, with careful attention to maintaining critical size and shape, a novel cylindrical pellet is produced which has no tendency to "log-jam" in the extruder hopper.

DESCRIPTION OF THE INVENTION

According to the present invention there is described a process for making silicone rubber pellets, said process comprising:
(i) extruding a silicone rubber composition through a die having at least one opening to produce at least one strand of said composition;
(ii) passing each said strand into a chamber filled with a dust cloud of a dry particulate agent for preventing silicone rubber pellets from adhering to one another;
(iii) comminuting each said strand into a plurality of pellets in said chamber and allowing said dry particulate agent to coat each such pellet; and
(iv) removing said pellets from said chamber.

Also provided by this invention are uniquely useful silicone rubber pellets. This aspect of the invention comprises pelletized silicone rubber having a uniform coating of a dry particulate agent for preventing said pellets from adhering to one another, said pellets being cylindrical in shape and ranging from about ⅛ to about ¼ inches in diameter and from about ⅛ to about ½ inches in length.

The silicone rubber employed will be a conventional material, generally comprising a vulcanizable poly(diorganosiloxane) gum, usually a filler, optionally processing aids, catalysts, pigments, stabilizers, and the like.

The vulcanizable poly(diorganosiloxane) gums are well known to those skilled in the art. In general, they are high molecular weight linear polymers. More specifically, they will be members of a family represented by the formula

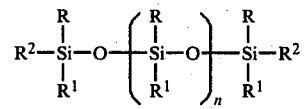

wherein R and $R^1$ are monovalent hydrocarbon radicals, such as aliphatic, haloaliphatic, and cycloaliphatic radicals, e.g., alkyl, alkenyl, cycloalkyl, haloalkyl, including methyl, ethyl, propyl, chlorobutyl, cyclohexyl, trifluoropropyl, aryl radicals and halogenated aryl radicals such as phenyl, chlorophenyl, xylyl, tolyl, and the like; aralkyl radicals such as phenylethyl, benzyl, and the like, cyanoalkyl, such as cyanoethyl; and R and $R^1$ can be the same or different, but preferably are methyl or methyl and vinyl, n is a number high enough to confer gum like properties on the polymer (see, e.g., Kirk, Ind. Eng. Chem. 51, 515 (1959), incorporated herein by reference), and wherein $R^2$ can include the same values as R and $R^1$ as well as hydroxyl, alkoxy, aryloxy, and the like.

The poly(diorganosiloxane) gums are highly viscous masses or gummy elastic solids depending on the state of condensation, the condensing agent employed, and the starting organopolysiloxane used to make the gummy material. A typical gum is obtained by the condensation of a liquid poly(organosiloxane) with one of the well known condensing agents, e.g., ferric chloride hexahydrate, phenyl phosphoryl chloride, alkaline condensing agents, such as potassium hydroxide, sodium hydroxide and the like. A typically useful gum is prepared by mixing together about 95 mole % of octamethylcyclotetrasiloxane, and about 5 mole % decamethyltetrasiloxane at a temperature of 150°–175° C. for about 4 hours with about 0.01% potassium hydroxide until a highly viscous gum is obtained.

Illustrative poly(dioxganosiloxane) gums will comprise poly(dimethylsiloxanes), copolymers of dimethylsiloxane and methylvinylsiloxane, copolymers of dimethylsiloxane and diphenylsiloxane, terpolymers of dimethylsiloxane, phenylmethylsiloxane, and methylvinylsiloxane, terpolymers of dimethylsiloxane, methylvinylsiloxane and methyltrifluoropropylsiloxane, copolymers of dimethylsiloxane and ethylvinylsiloxane, and copolymers of dimethylsiloxane and methylcyanoethylsiloxane. The homo- and copolymers can be blocked at the ends, e.g., with triorganosiloxy units, such as trimethylsiloxane, dimethylvinylsiloxane, dimethylphenylsiloxane units, and the like. Preferably, the organo substituents in the gum will be selected from methyl, vinyl, phenyl or trifluoropropyl. However, other organic radicals may also be included, such as ethyl, propyl, octadecyl, allyl, cyclohexenyl, naphthyl, chloromethyl, bromophenyl, and the like.

The compositions can be vulcanized or rendered vulcanizable by any methods conventional in silicone rubber technology, e.g., by heat or high energy radiation. Preferably, however, the composition will include a small but effective amount of a heat-reactive vulcanization catalyst. The preferred such catalysts will be organic peroxides and organic per-esters, for example, benzoyl peroxide, tertiary butyl peracetate, dicumyl peroxide, cumyl tert. butyl peroxide, 2,5-di-tert. butyl peroxy-2,5-dimethyl hexane, 2,4-dichlorobenzoyl peroxide, tert. butyl perbenzoate, hexylene glycol perbenzoate, and the like. The preferred catalysts are 2,4-dichlorobenzoyl peroxide and benzoyl peroxide.

The amount of heat-reactive catalyst used will vary, but will generally range from 0.5 to 7 parts by weight, and preferably from about 0.5 to 1.5 parts by weight per 100 parts by weight of the poly(diorganosiloxane)gum.

Generally, the composition may also include a filler or a mixture of fillers. The preferred fillers are finely divided reinforcing fillers, e.g., silica, either aerogel or fumed, having a specific surface area of 50 to 350 m²/g. Other fillers, such as semi-reinforcing and extending fillers, such as diatomaceous earth, ground quartz, alkaline earth carbonates and sulfates (e.g., CaCO$_3$) or silicates (e.g., zirconium silicate), metallic oxides, such as iron oxide, zinc oxide, aluminum oxide, titanum oxide, and the like, and carbon black, can also be present.

The amount of filler can vary and will depend upon the desired characteristics of the final product. It will generally be between 10 and 150 parts by weight of filler per 100 parts by weight of the silicone gum.

In addition to the components enumerated, the compositions may also contain other conventional ingredients, such as pigments, thermal stability additives and materials such as low molecular weight hydroxyl silanes which are intended to facilitate processing.

The apparatus in which the pellets are made comprises a die with at least one, and preferably, a plurality of holes, and especially the die is in the form of a plate with concentric rings of holes, e.g., of from about ⅛ to about ¼ inches in diameter, preferably round holes, The apparatus also includes means to sectionalize the extruded strands, preferably a knife or plurality of knives adapted to pass across the die face and cut the emerging strand or strands. Preferably, the knive(s) will be adapted to rotate across the die face by being attached to a rotating support. Preferably, the speed of rotation of the support for the knives will be variable. Extrusion will be into a suitably sized chamber in which a dust environment is suspended. The chamber is attached to a "head" comprising the die and the means for comminuting the strands, e.g., knives. Preferably, the chamber will be adapted to rotate. One preferred embodiment is an apparatus in which the chamber is drum-like and has two opposing concentric screws separated by a screen so that rotation of the chamber causes the pellets to travel therethrough and then to drop into a discharge chute. Surplus particulate matter, i.e., dust, falls off of the pellets through a separating screen and, if desired, can be returned, e.g., with an outer screw to the head of the drum and be dropped by means for producing the dust cloud, e.g., rotating cutting knives, a screen, a fan or an obvious equivalent.

The dry particulate agent for preventing the silicone rubber pellets from adhering to one another should be finely divided and capable of suspension as a dusty fog or cloud. It should not adversely affect the physical or electrical properties of the rubber and it should be stable at the elevated temperatures used during subsequent processing. Preferred particulate materials are mica, talc and diatomaceous earth of the size known in the art as micronized. One suitable form of mica is sold under the tradename Micafine Superex. In a preferred size range, greater than 99% by weight of the material will pass through a screen with a 0.076 mm. mesh size (U.S. Sieve Series No. 200).

Instead of the rotating drums, other means can be used to form the dust cloud or fog. For example, the dry particulate agent, e.g., mica, can be propelled with an air jet against the face of the extruder. This is also effective to coat the pellets as they are extruded from the die head and cut.

DESCRIPTION OF THE PREFERRED EMBODIMENT

The following example illustrates a preferred manner of carrying out the invention. It is merely illustrative, and is not to be construed to limit the invention in any manner whatsoever.

EXAMPLE

A quantity of vulcanizable silicone rubber, comprising 100 parts by weight a poly(dimethylsiloxane)gum, 89 parts by weight of silica reinforcing filler, and 0.8% of a peroxide catalyst is extruded at 108° F. in a 6 in. extruder through a die plate containing 3/16" round holes in 2 concentric rings fitted with a rotating support for knife blades with a rotation speed of 84 rpm. A rotating chamber of 30"×36" in a drum-like shape is fitted to the die/knife sub-assembly and the chamber is filled with micronized mica (Diamond Mica Company, product designation C 3000). The chamber is rotated at 10 rpm and this, together with the paddles at the extruder end of the drum (radically positioned) keeps the mica in the form of a dust cloud. The knives cut the strands into cylinders of fixed length as the dust coats them evenly with mica. The coated pellets travel through the chamber on the inner of two concentric, opposing screws which are separated by a screen, then drop into a discharge chute. The surplus mica falls off the pellets through the separating screen and is returned by the outer screw to the head of the drum and recycled.

The speed of extrusion and the rotation of the knives are adjusted to produce coated pellets in the form of cylinders within the size range of 3/16" in diameter by ⅜" long. This is optimum to prevent "log-jamming" in extruder hoppers later. If the length is increased to ¾", there tends to be hang-ups later. Thus ½ inch in length appears to be about the maximum for this use. If smaller or larger holes are used in the die plates, cylinders having corresponding diameters will be produced. Generally, the diameters will lie between ⅛ and ¼ inches and the lengths will be between ⅛ and ½ inches.

Obviously, other variations in the methods and articles are possible in light of the above teachings. For example, instead of micronized mica, talc or diatomaceous earth can be used as particulate agents for preventing pellets from adhering to one another. Instead of poly(dimethylsiloxane) gums, other silicone gums, e.g., those containing methylphenylsiloxane units can be used. Uncatalyzed compositions can be pelletized, and unfilled compositions also can be pelletized.

The products produced in this invention have many and varied uses. They are useful for extruded insulation on wires, in extruded tubes, and, after molding, as gasket materials, shock absorbers, and the like, especially under high temperature conditions.

The invention has been broadly described and variations may be made without departing from the spirit and scope thereof.

I claim:

1. A process for making silicone rubber pellets, said process comprising:

(i) extruding a silicone rubber composition through a die having a plurality of openings to produce a plurality of strands of said composition;

(ii) passing said plurality of strands into a chamber filled with a dust cloud of a dry particulate agent for preventing silicone rubber pellets from adhering to one another and simultaneously with said passing, comminuting each of said strands into a plurality of pellets in said chamber and allowing said dry particulate agent to coat each said pellet whereby said pellets are maintained out of substantial contact with each other, and out of contact with any part of said chamber until after said pellets have been coated with said dry particulate agent; and (iii) removing said pellets from said chamber.